Feb. 24, 1959 W. F. HOLIN 2,874,646
RAILWAY VEHICLE SUSPENSION
Filed Aug. 26, 1955 3 Sheets-Sheet 3

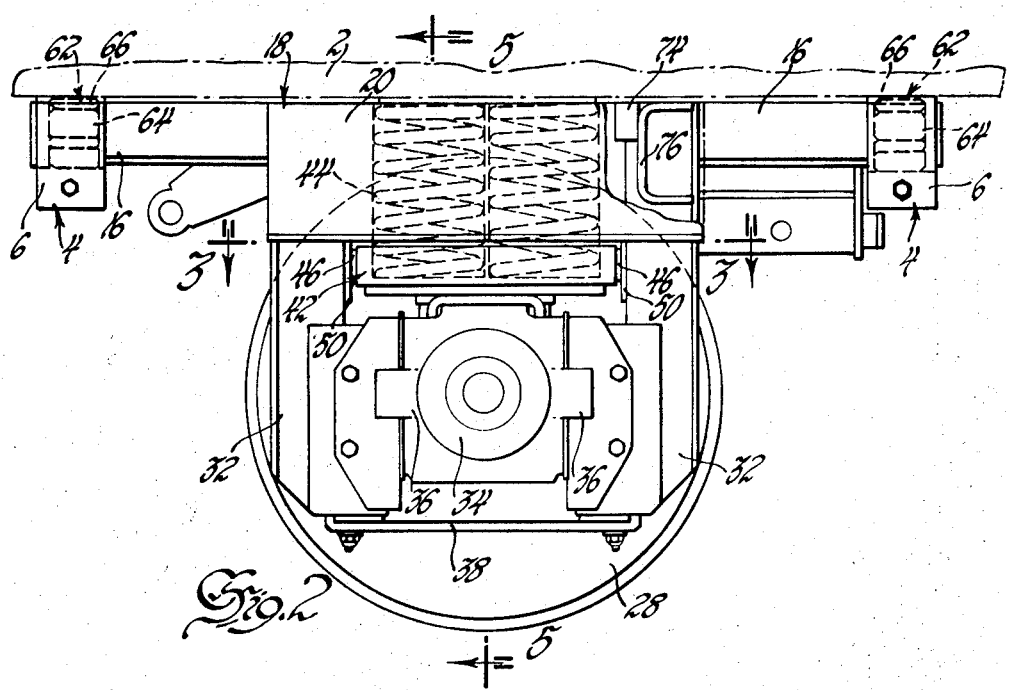

INVENTOR
William F. Holin
BY
J. C. Thorpe
ATTORNEY

United States Patent Office 2,874,646
Patented Feb. 24, 1959

2,874,646

RAILWAY VEHICLE SUSPENSION

William F. Holin, Riverside, Ill., assignor to General Motors Corporation, Detroit, Mich., a corporation of Delaware Application August 26, 1955, Serial No. 530,789

7 Claims. (Cl. 105—171)

This invention relates generally to truck suspensions for railway vehicles and more particularly to a rear locomotive suspension utilizing a single idler wheel and axle set.

With the advent of the new lightweight passenger trains and the accompanying reduction in weight less horsepower is required which in many instances can be provided in a single driving truck where formerly two such trucks were used.

Due to the elimination of the need for a second driving truck in lieu thereof it is proposed to use a single-axle idler truck assembly for supporting the rear end of the locomotive with the single driving truck being located at the front end in order to "pull" the locomotive thereby increasing its stability as it moves along the tracks. Since, however, the inertia forces of the body of a locomotive moving along the rails become relatively large unless some means is provided in a unique rear idler truck to compensate for irregularities in the trackage, an extremely rough lateral ride will be the result.

The present invention has been proposed to achieve a superior riding locomotive by providing a rear idler truck assembly which allows the inertia of the forward-moving locomotive to dominate and the idler truck to move resistively laterally underneath the locomotive so as to compensate for the aforementioned track irregularities.

It is, then, an object of the present invention to provide a unique railway vehicle suspension which eliminates the usual bolster and which allows a certain amount of damped lateral movement of the suspension relative to the locomotive.

It is a more specific object of this invention to provide a single-axle truck assembly which resiliently supports one end of the locomotive and which has limited, damped, lateral movement relative to one end of the locomotive.

It is an even more specific object of this invention to provide a suspension for one end of a railway vehicle which utilizes a truck frame supported by the underside of the vehicle, the frame being adapted to move laterally relative to the underside of the vehicle and forming the guide means for journal boxes of the wheel and axle sets which through the medium of springs support the end of the vehicle directly on the journal boxes, these springs serving the additional function of recentering the frame when displaced laterally from its centered position.

For further objects and a fuller understanding of this invention reference may be had to the accompanying detailed description and drawings, in which:

Fig. 2 is a side view in elevation of the suspension with portions broken away to illustrate how the frame of the suspension is prevented from moving longitudinally relative to the end of the vehicle.

Fig. 3 is a view taken on the line 3—3 of Fig. 2 to more particularly illustrate how the lower ends of the supporting springs are anchored in the spring seat provided on the upper side of each journal box assembly and, further, how this spring seat is guided for vertical movement with respect to the pedestals forming a part of the truck frame.

Fig. 4 is an enlarged elevational view in section taken on the line 4—4 of Fig. 1 and illustrates the details of the construction which enables the frame to be directly supported by the underside of the vehicle.

Figure 1:
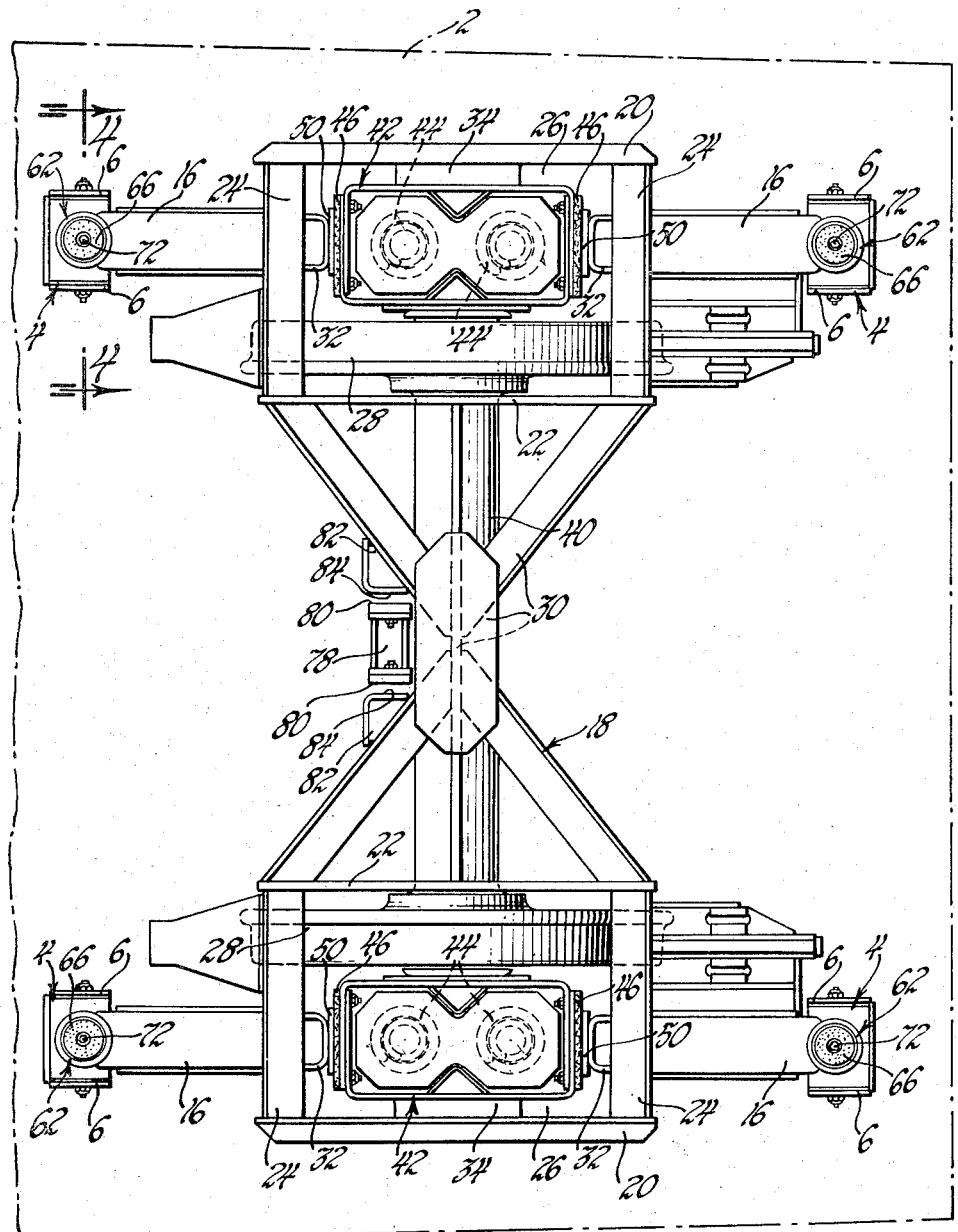
Fig. 1 is a view in plan of the suspension showing its relation to the underside of one end of a railway vehicle.

Referring now to the drawings, the end of the vehicle is indicated by a numeral 2. On occasion during the description the term underbody will be used and it is intended by the use of this term to mean the underside of the body of the vehicle. Secured to the underbody and depending therefrom at four rectangularly spaced locations are bracket assemblies 4 whose details are particularly shown in Fig. 4. These assemblies 4 each comprise a pair of laterally spaced, longitudinally extending depending plates 6 which are welded or otherwise secured to the underbody. Securing the plates 6 together and supported thereby is a U-shaped plate 8, preferably of some medium grade steel, whose legs 10 are fastened to the lower ends of plates 6 by means of bolt and nut assemblies 12.

With this construction the bracket assemblies 4 are provided with an upwardly facing supporting platform or surface 14. These surfaces 14 support longitudinally, oppositely extending appendages 16 rigidly fixed, as by welding, to the truck frame indicated generally by a numeral 18. The appendages 16 and their relation to the bracket assemblies 4 will be discussed later.

Figure 5:
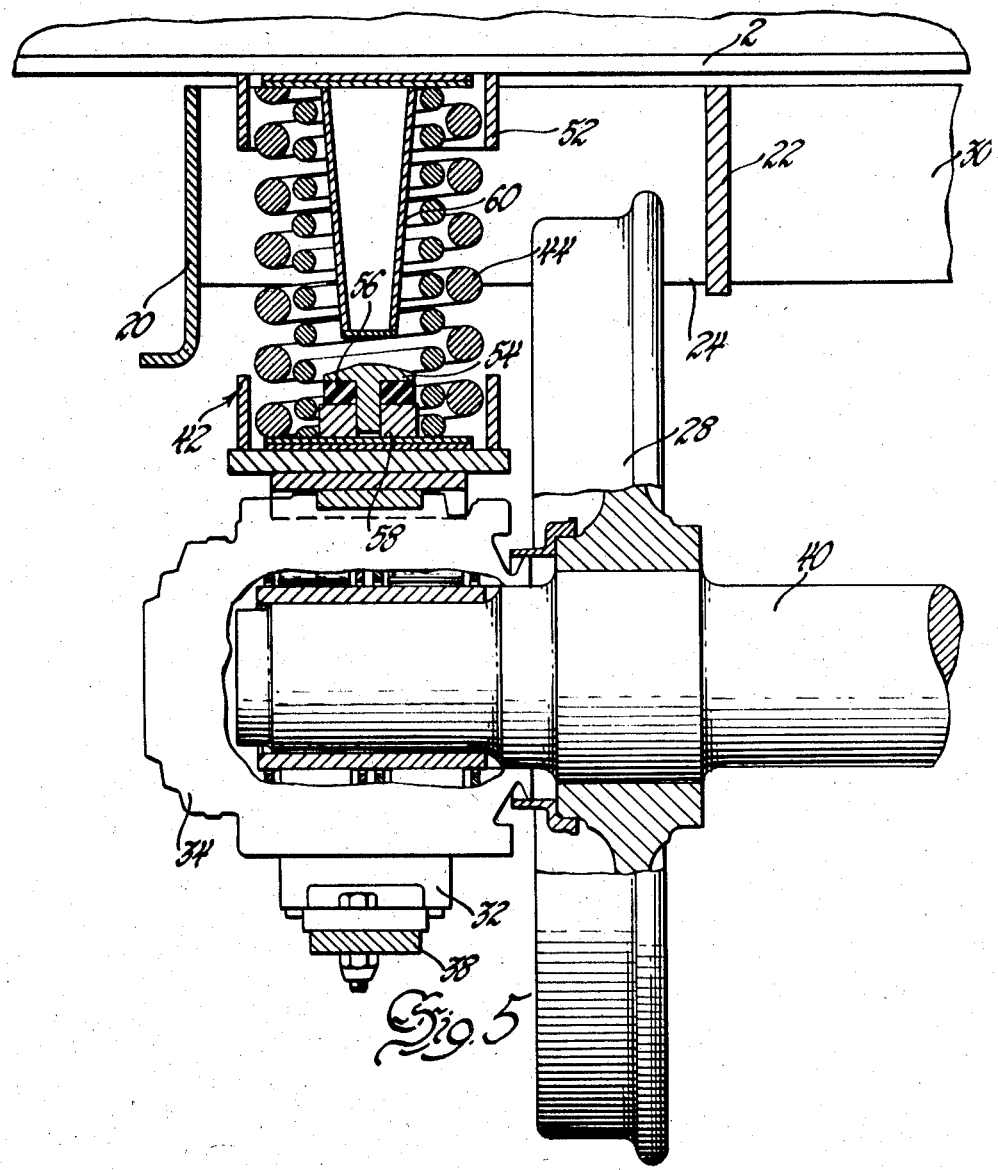
Fig. 5 is a sectional view taken on the line 5—5 of Fig. 2 and illustrates how the lower and upper ends of the springs are anchored in seats on the journal boxes on the undersides of the railway vehicle, respectively, and also the unique stops for restricting vertical movement of the journal boxes relative to the underside of the vehicle.

The truck frame 18, as best seen in Figs. 1 and 5, includes longitudinally extending members 20 and 22 as well as transversely extending members 24 which are suitably fixed together to form laterally disposed rectangular constructions having openings 26 provided therein which enable the frame to be placed relatively closer to the rails without interfering with the wheels 28. These rectangular constructions made up by the members 20, 22, 24 are rigidly connected together by the laterally extending frame construction 30.

Referring now to Fig. 2, it will be observed that the frame 18 includes downwardly depending sets of pedestals 32 between which are journaled for vertical movement with respect thereto journal box assemblies 34. These journal box assemblies are restricted to vertical movement between said sets of pedestals 32 by means of the usual abutting ears 36. The lower ends of the pedestals are suitably connected together by means of the pedestal tie bars 38. The journal box assemblies 34 journal the ends of the axle 40 having pressed thereon the aforementioned wheels 28.

In Fig. 2 it will be noted that the upper side of each journal box assembly 34 is provided with a lower spring seat assembly 42 which anchors the lower ends of supporting spring sets 44. These seats 42 have secured thereto (see Fig. 3) phenolic plates 46 by means of nut and bolt assemblies 48. These phenolic plates 46 frictionally abut cooperating plates 50 (preferably of steel) provided on the upper portions of the pedestals 32 and the plates 46 and 50 are adapted to slide vertically relative to each other. The use of these differential materials for the plates 46 and 50 reduces noise and concentrates the wear on plates 46 which are more easily replaced. The upper ends of the supporting springs 44 are received in upper spring seats 52 (see Fig. 5) provided on the underside of the vehicle, i. e., the underbody, and serve to resiliently support one end of the vehicle on the journal boxes and the wheel and axle sets.

From the foregoing it will be appreciated that the journal boxes slide between the sets of pedestals 32 and the sliding action between the plates 46 and 50 will act to damp relative vertical movement between the underbody and the wheel and axle sets. To limit this relative vertical movement between underbody and wheel and axle sets the lower spring seats 42 at the centers of the spring sets 44 have been provided with upwardly facing buttons 54 (see Fig. 5) which are cushioned by a resilient washer 56 interposed between the head of the button and an abutting member 58 secured to the seat 42. The button 54 is adapted to be engaged after predetermined relative vertical movement between the underbody and the wheel and axle sets by means of a depending abutment 60 fixed to the downwardly facing upper spring seat 52 on the underbody. Each depending abutment 60, as observed from Fig. 5, extends downwardly into the spring sets 44 and is tapered to allow the spring set 44 to incline laterally without interference.

Returning now particularly to Figs. 2 and 4, it will be observed that the appendages 16 are supported on the surfaces 14 by fabricated ends 62 so that these ends 62 can slide on surfaces 14. The fabricated ends 62 include an intermediate connecting member 64 between sides of the appendages 16 and an upper phenolic wear plate 66, a lower phenolic wear plate 68 resting on surface 14, and a resilient washer 70 interposed between the member 64 and the lower phenolic wear plate 68. The wear plates 66 and 68 and washer 70 are secured to member 64 by means of a bolt and nut assembly 72 extending therethrough. Again, it is emphasized that the use of differential materials for the plates 66, 68 and surface 14 reduces noise, concentrates the wear on the easily replaced plates, and provides better frictional damping.

It may now be appreciated that the truck frame 18 is actually supported by the underbody of the vehicle through the bracket assemblies 4 and the appendages 16 including the fabricated ends 62 and further that this truck frame assembly 18 is free to move laterally with respect to the underbody. To prevent any longitudinal movement of the frame 18 relative to the underbody, the underbody adjacent each of the four corners of frame 18 has been provided with downwardly depending abutments 74 (see Fig. 2) which engage cooperating abutments 76 provided on the assembly 18. It will be observed that the abutments 74, 76 have laterally extending substantially vertical abutting surfaces which while restricting relative longitudinal movement between the frame and the underbody do not prevent relative lateral movement.

Since extensive lateral movement of the frame relative to the underbody would tend to unstabilize the frame, the underbody has been provided with (see Fig. 1) a center stop assembly 78 having laterally, outwardly facing abutting surfaces 80 which after predetermined lateral movement of the frame are engaged by cooperating stops 82 having laterally, inwardly facing abutting surfaces 84.

From the foregoing description it will now be apparent that the truck frame is actually supported by the underbody and is free to "float" laterally with respect to the underbody. Since this floating action of the frame assembly 18 includes the pedestals 32, and consequently the journal boxes and wheel and axle sets, the entire assembly is free to move back and forth beneath the railway vehicle against resilient resistive action on the part of the springs 44. This floating action absorbs irregularities of the rails without transmitting these irregularities to the body of the vehicle. It is particularly emphasized that the supporting springs extend directly from the journal box assemblies to the underside of the vehicle and that these springs in addition to supporting one end of the vehicle also provide the resilient resistiveness which cushions these lateral irregularities and acts to restore the frame to its centered position. The weight of the frame rests in the bracket assemblies 4 and the fabricated ends 62 serve to damp the floating action of the frame thereby preventing it from "galloping."

What I claim is:

1. In combination with a railway vehicle underbody having longitudinally separated laterally extending substantially vertical surfaces depending therefrom, a truck frame assembly having laterally extending surfaces substantially parallel to and cooperating with said longitudinally separated surfaces to allow lateral and prevent longitudinal movement of said frame assembly relative to said underbody, and helical coil springs interposed between said underbody and said frame assembly having their opposite ends anchored thereto tending to return said frame assembly to a centered position relative to said underbody when displaced laterally with respect thereto.

2. In combination with a railway vehicle underbody having longitudinally separated laterally extending substantially vertical surfaces depending therefrom, a truck frame having laterally extending surfaces substantially parallel to and engageable with said longitudinally separated surfaces to allow lateral and prevent longitudinal movement of said frame relative to said underbody, oppositely disposed sets of pedestals depending from said frame, journal box assemblies interposed between said pedestals, means restricting said journal box assemblies to vertical movement relative to said pedestal sets, supporting means on said underbody for said frame, supporting helical coil springs interposed between said underbody and said journal boxes and having their ends restricted relative thereto so that on displacement of said frame laterally relative to said underbody said springs tend to restore said frame to a normally centered position relative to said underbody.

3. In combination with a railway vehicle underbody having longitudinally separated laterally extending substantially vertical surfaces depending therefrom, a truck frame having laterally extending surfaces substantially parallel to and engageable with said longitudinally separated surfaces to allow lateral and prevent longitudinal movement of said frame relative to said underbody, oppositely disposed sets of pedestals depending from said frame, journal box assemblies interposed between said pedestals, means restricting said journal box assemblies to vertical movement relative to said pedestal sets, means supporting said frame on said underbody, supporting helical coil springs interposed between said underbody and said journal boxes and having their ends restricted relative thereto so that on displacement of said frame laterally relative to said underbody said springs tend to restore said frame to a normally centered position relative to said underbody, and means to limit lateral displacement of said frame relative to said underbody.

4. In combination with a railway vehicle underbody having longitudinally separated laterally extending substantially vertical surfaces depending therefrom, a truck frame having laterally extending surfaces substantially parallel to and engageable with said longitudinally separated surfaces to allow lateral and prevent longitudinal movement of said frame relative to said underbody, oppositely disposed sets of pedestals depending from said frame, journal box assemblies interposed between said pedestals, means restricting said journal box assemblies to vertical movement relative to said pedestal sets, supporting springs interposed between said underbody and said journal boxes and having their ends anchored thereto so that on displacement of said frame laterally relative to said underbody said springs tend to restore said frame to a normally centered position relative to said underbody, and means supporting said frame on said underbody comprising upwardly facing surfaces fixed to said underbody and spaced therefrom, appendages fixed to said frame and having downwardly facing surfaces slidably supported on said upwardly facing surfaces to thereby frictionally damp lateral movement of said frame relative to said underbody.

5. In combination with a railway vehicle underbody having longitudinally separated laterally extending substantially vertical surfaces depending therefrom, a truck frame having laterally extending surfaces substantially parallel to and engageable with said longitudinally separated surfaces to allow lateral and prevent longitudinal movement of said frame relative to said underbody, oppositely disposed sets of pedestals depending from said frame, journal box assemblies interposed between said pedestals, means restricting said journal box assemblies to vertical movement relative to said pedestal sets, supporting springs interposed between said underbody and said journal boxes and having their ends anchored thereto so that on displacement of said frame laterally relative to said underbody said springs tend to restore said frame to centered position relative to said underbody, and means slidably supporting said frame on said underbody comprising upwardly facing surfaces fixed to said underbody and spaced therefrom, appendages fixed to said frame and having downwardly facing removable surfaces slidably supported on said upwardly facing surfaces to thereby frictionally damp lateral movement of said frame relative to said underbody, said downwardly facing and upwardly facing surfaces having different wear characteristics to concentrate wear on said removable surfaces and reduce noise.

6. In combination with a railway vehicle underbody having longitudinally separated laterally extending substantially vertical surfaces depending therefrom, a truck frame having laterally extending surfaces substantially parallel to and engageable with said longitudinally separated surfaces to allow lateral and prevent longitudinal movement of said frame relative to said underbody. oppositely disposed sets of pedestals depending from said frame, journal box assemblies interposed between said pedestals, means restricting said journal box assemblies to vertical movement relative to said pedestal sets, supporting springs interposed between said underbody and said journal boxes and having their ends anchored thereto so that on dispalcement of said frame laterally relative to said underbody said springs tend to restore said frame to centered position relative to said underbody, and means supporting said frame on said underbody comprising upwardly facing surfaces fixed to said underbody and spaced therefrom, appendages fixed to said frame and having downwardly facing surfaces slidably supported on said upwardly facing surfaces to thereby frictionally damp lateral movement of said frame relative to said underbody, and resilient means interposed between said appendages and said downwardly facing surfaces.

7. In combination with a railway vehicle underbody having longitudinally separated laterally extending substantially vertical surfaces depending therefrom, a truck frame having laterally extending surfaces substantially parallel to and engageable with said longitudinally separated surfaces to allow lateral and prevent longitudinal movement of said frame relative to said underbody, oppositely disposed sets of pedestals depending from said frame, journal box assemblies interposed between said pedestals, means restricting said journal box assemblies to vertical movement relative to said pedestal sets, supporting springs interposed between said underbody and said journal boxes and having their ends anchored thereto so that on displacement of said frame laterally relative to said underbody said springs tend to restore said frame to centered position relative to said underbody, means to limit displacement of said frame laterally relative to said underbody, and means supporting said frame on said underbody comprising upwardly facing surfaces fixed to said underbody and spaced therefrom, appendages fixed to said frame and having downwardly facing surfaces slidably supported on said upwardly facing surfaces to thereby frictionally damp lateral movement of said frame relative to said underbody, said downwardly facing and upwardly facing surfaces having different wear characteristics.

References Cited in the file of this patent

UNITED STATES PATENTS

| | | |
|---|---|---|
| 2,113,465 | Kjolseth | Apr. 5, 1938 |
| 2,377,883 | Hickman | June 12, 1945 |